United States Patent
Tarokh et al.

(10) Patent No.: US 7,274,751 B2
(45) Date of Patent: Sep. 25, 2007

(54) APPARATUS AND METHOD FOR TRANSMITTING AND RECEIVING SIGNALS USING MULTIPLE ANTENNAS IN MOBILE COMMUNICATION SYSTEMS

(75) Inventors: Vahid Tarokh, Cambridge, MA (US); Jae-Hak Chung, Seoul (KR); Chan-Soo Hwang, Yongin-shi (KR); Yung-Soo Kim, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 735 days.

(21) Appl. No.: 10/674,735

(22) Filed: Sep. 30, 2003

(65) Prior Publication Data

US 2004/0101066 A1   May 27, 2004

(30) Foreign Application Priority Data

Sep. 30, 2002 (KR) .................. 10-2002-0059621

(51) Int. Cl.
H04L 27/04 (2006.01)
H04L 1/02 (2006.01)
(52) U.S. Cl. ..................... 375/299; 375/347
(58) Field of Classification Search ............... 375/299, 375/347, 295, 316, 349; 455/59, 562, 272, 455/561; 342/368, 371
See application file for complete search history.

(56) References Cited

U.S. PATENT DOCUMENTS

| | | | |
|---|---|---|---|
| 6,127,971 A | 10/2000 | Calderbank et al. | |
| 6,452,981 B1 | 9/2002 | Raleigh et al. | |
| 6,999,724 B2 * | 2/2006 | Chizhik et al. | 455/63.1 |
| 2001/0034868 A1 | 10/2001 | El-Gamal et al. | |
| 2002/0142723 A1 * | 10/2002 | Foschini et al. | 455/59 |
| 2003/0124976 A1 * | 7/2003 | Tamaki et al. | 455/15 |

FOREIGN PATENT DOCUMENTS

WO    WO 02/35762 A1    5/2002

OTHER PUBLICATIONS

V. Tarokh, A. Naguib, N. Seshadri, and A. R. Calderbank, "Space-Time Codes for High Data Rate Wireless Communications: Performance Criteria in the Presence of Channel Estimation Errors, Mobility, and Multiple Paths," *IEEE Trans. Inform. Theory*, vol. 47, pp. 199-207, Feb. 1999.

V. Tarokh, A. Naguib, N. Seshadri, and A. R. Calderbank, "Combined Array Processing and Space-Time Coding," *IEEE Trans. Inform. Theory*, vol. 45, pp. 1121-1128, May 1999.

V. Tarokh, N. Seshadri, and A. R. Calderbank, "Space-Time Codes for High Data Rate Wireless Communications: Performance Criterion and Code Construction," *IEEE Trans. Inform. Theory*, vol. 44, pp. 744-765, Mar. 1998.

* cited by examiner

*Primary Examiner*—Khai Tran
(74) *Attorney, Agent, or Firm*—The Farrell Law Firm (57) ABSTRACT

According to one aspect of the present invention, there is provided a signal transmission apparatus for a mobile communication system. In the signal transmission apparatus, a frame segmentation section segments an input frame into $B_k$ bit group, where k=1, . . . , K. A first group of encoders encodes $B_k$ bit group and outputs encoded symbols. A second group of encoders encodes other $B_{k'}$ bit group and output other encoded symbols. Each encoded symbol is encoded again to the transmit antennas using different functions. A transmission section includes a plurality of antennas in groups of a predetermined number of antennas, and the total number N of antennas is larger than the sum of the number of antenna groups. The transmission antennas transmit symbols encoded by one of the encoders.

12 Claims, 6 Drawing Sheets

APPARATUS AND METHOD FOR TRANSMITTING AND RECEIVING SIGNALS USING MULTIPLE ANTENNAS IN MOBILE COMMUNICATION SYSTEMS

PRIORITY

This application claims priority under 35 U.S.C. § 119 to an application entitled "Apparatus and Method for Transmitting/Receiving Signals Through Multiple Antennas in a Mobile Communication System" filed in the Korean Intellectual Property Office on Sep. 30, 2002 and assigned Ser. No. 2002-59621, the contents of which are incorporated herein by reference.

BACKGROUND OF THE INVENTION

1. Field of the Invention

The present invention relates generally to mobile communication systems, and in particular, to an apparatus and method for transmitting and receiving signals using multiple antennas.

2. Description of the Related Art

In CDMA (Code Division Multiple Access) mobile communication systems, such as CDMA2000 systems or UMTS (Universal Mobile Telecommunications System) systems, multiple antennas are used to implement schemes for increasing transmission capacity on radio channels.

Schemes using multiple antennas are classified into multiplexing schemes and diversity schemes. In multiplexing schemes, parallel channels are set up between a transmitter and a receiver to transmit signals. In diversity schemes, a transmitter or a receiver uses multiple antennas to improve the performance of transmission or reception. The multiplexing scheme does not improve transmission/reception reliability since it cannot provide sufficient diversity effects, but increases a transmission rate. In addition to these schemes, an improved scheme is used in which multiple antennas are used along with channel coding techniques in order to improve transmission performance, i.e., decrease a transmission error rate, in a transmitter. As the number of antennas of the transmitter and the receiver in diversity schemes increases, however, the schemes does not increase transmission rate, but increases systems complexity.

In order to solve this problem, a scheme for dividing antennas of a transmitter into several groups for signal transmission has been proposed (see V. Tarokh, A. Naguib, N. Seshadri, A. R. Calderbank, "Combined array processing and space-time coding," IEEE trans. On Information Theory, vol. 45, pp. 1121-1128, May 1999). The proposed scheme is disclosed in U.S. Pat. No. 6,127,971, entitled "Combined Array Processing and Space-Time Coding," issued on Oct. 3, 2000. This scheme is advantageous in that the complexity of a receiver is not increased in a geometrical progression as the number of antennas increases, and a transmission rate of a signal can increase by separating a space channel into several subchannels.

However, in this scheme, when the number of transmission antennas is small, the number of antennas in each divided group also decreases. In addition, it is difficult to obtain multiplexing effects. Under such conditions, this scheme can obtain only a diversity effect. In addition, it is hard to obtain even the diversity effect, because when the number of transmission antennas is small, the number of antennas in each divided group is also small.

SUMMARY OF THE INVENTION

It is, therefore, an object of the present invention to provide an apparatus and method for transmitting/receiving signals using multiple antennas along with channel coding techniques in mobile communication systems.

It is another object of the present invention to provide an apparatus and method for obtaining a multiplexing effect and a diversity effect in mobile communication systems which transmit and receive signals using multiple antennas along with channel coding techniques.

It is yet another object of the present invention to provide an apparatus and a method for obtaining high multiplexing gain and diversity gain even when signals are transmitted through a small number of grouped transmission antennas in mobile communication systems which transmits and receives signals using multiple antennas along with channel coding techniques.

To achieve the above and other objects, the invention provides a method for overlapping signals not only with an antenna of its own group but also with an antenna in another group when transmitting signals via transmission antennas. In this way, it is possible to obtain greater diversity effects, using a given number of antennas, than with the conventional method.

According to one aspect of the present invention, there is provided a signal transmission apparatus for a mobile communication system. In the signal transmission apparatus, a frame segmentation section segments an input frame into $B_k$ bit group, where k=1, . . . , K. A first group of encoders encodes $B_k$ bit group and outputs encoded symbols. A second group of encoders encodes other $B_{k'}$ bit group and output other encoded symbols. Each encoded symbol is encoded again to the transmit antennas using different functions. A transmission section includes a plurality of antennas in groups of a predetermined number of antennas, and the total number N of antennas is larger than the sum of the number of antenna groups. The transmission antennas transmit symbols encoded by one of the encoders.

Preferably, the encoders are trellis encoders.

Preferably, the total sum $N_k$ of the sizes of the groups of antennas is larger than N.

According to another aspect of the present invention, there is provided a signal reception apparatus for a mobile communication system. The signal reception apparatus includes antennas connected to M receivers; k decoders, k being smaller than M; and a decomposer for decomposing at least one reception symbol of M reception symbols output from the receivers and outputting the decomposed symbol to at least two decoders of the k decoders.

Preferably, the decoders are trellis decoders.

Preferably, the antennas are in groups of a predetermined number of antennas.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Several preferred embodiments of the present invention will now be described in detail with reference to the attached drawings. In the drawings, the same or similar elements are denoted by the same reference numerals even though they are depicted in different drawings. In the following description, a detailed description of known functions and configurations incorporated herein has been omitted for conciseness.

The invention described below is provided to solve a problem in the conventional signal transmission scheme disclosed in V. Tarokh, A. Naguib, N. Seshadri, A. R. Calderbank, "Combined array processing and space-time coding," IEEE trans. On Information Theory, vol. 45, pp. 1121-1128, May 1999, and U.S. Pat. No. 6,127,971, entitled "Combined Array Processing and Space-Time Coding," issued on Oct. 3, 2000. The reference introduces a method for dividing N transmission antennas into small non-overlapped groups having a size of $N_i$, and using space-time codes, called component codes, in order to transmit information from antennas in each group, thereby remarkably reducing complexity of coding and decoding.

The present invention improves on conventional technology by allowing antenna groups to have overlapped elements. Herein, this scheme will be referred to as "overlapped antenna grouping." In addition, the scheme of the invention enables superior trade-off between multiplexing gain and diversity gain, as compared with the conventional technology. In order to enable the trade-off, the invention introduces overlapped space-time codes, which are a new kind of space-time code for further simplifying coding and decoding algorithms used in connection with overlapped antenna grouping. The invention can provide a diversity of $(N-\gamma+1)(M-\gamma+1)$, given the number N of transmission antennas, the number M of reception antennas and a multiplexing gain $\gamma$.

A description of the invention will be made below. First, a communications model for transmitting and receiving signals using multiple antennas in a radio environment to which the invention is applied, and operations of combined array processing and space-time coding, will be described in brief. Next, overlapped antenna grouping and overlapped space-time coding according to an embodiment of the present invention will be described. Thereafter, it will be proved that the schemes according to an embodiment of the present invention simplify a structure of a coder and a decoder, and enable the best trade-off between multiplexing gain and diversity gain.

A. Communications Model

The invention considers communication systems in which a transmitter has N antennas and a receiver has M antennas. A combined array processor and a space-time coder receive a block of B input bits at each time slot t. The input bits are divided into K streams having a relation of $B_1+B_2+ \ldots +B_K=B$ and a length of $B_1, B_2, \ldots, B_K$. In a base station, antennas have a group of $N_1, N_2, \ldots, N_K$ antennas. The antennas are divided into K groups $G_1, G_2, \ldots, G_K$ having a relation of $N_1+N_2+ \ldots +N_K \geq N$. Each block $B_k$ (k=1, 2, \ldots, K) is coded by a space-time coder $C_k$. An output of the $C_k$ provides constellation symbols of $N_k$ (k=1, 2, \ldots, K) sequences which are simultaneously transmitted from antennas in a group $G_k$ at a time t. This provides constellation symbols of a total of N sequences which are simultaneously transmitted from antennas 1, 2, \ldots, N.

It is assumed that $c_t^{i,k}$ is a signal transmitted from an antenna i in a group $G_k$ at a time slot t, average constellation energy is 1, $E_k$ is average transmission power through an antenna i ($1 \leq i \leq N_k$) in a group $G_k$, and $\alpha_{i,j,k}$ is a path gain received at an antenna j ($1 \leq j \leq M$) from a transmission antenna i in a group $G_k$. A demodulator of a receiver calculates a decision statistic based on signals received at reception antennas j=1, 2, \ldots, M. A signal $r_t^j$ received by an antenna j at a time t is represented by Equation (1) as follows:

$$r_t^j = \sum_{k=1}^{K} \sum_{i=1}^{N_k} \sqrt{E_k}\, \alpha_{i,j,k} c_t^{j,k} + \eta_t^j \qquad (1)$$

In Equation (1), $\eta_t^j$ is a channel noise between transmission antennas and a reception antenna j at a time t. Path gains $\alpha_{i,j,k}$ are modeled with samples of independent complex Gaussian random variables having an average 0 and a power-per-dimension 0.5. This is identical to the case where consideration is taken of signals transmitted from different antennas under independent Rayleigh fading. At this point, it is assumed that path gains $\alpha_{i,j,k}$ are constant within a frame, and consideration is taken of quasi-static fading changing from frame to frame. The noise values $\eta_t^j$ (j=1, 2, \ldots, M) are modeled with samples of independent complex Gaussian random variables having an average 0 and a power-per-dimension 0.5. Equation (1) can be rewritten in a vector form as Equation (2):

$$r_t = \sum_{k=1}^{K} \sqrt{E_k}\, \Omega_k c_t^{j,k} + \eta_t \qquad (2)$$

Variables used in Equation (2) are represented by Equation (3), Equation (4), Equation (5) and Equation (6) below.

$$c_t^k = (c_t^{1,k}, c_t^{2,k}, \ldots, c_t^{N_k,k})^T \qquad (3)$$

$$r_t = (r_t^1, r_t^2, \ldots, r_t^M)^T \qquad (4)$$

$$\eta_t = (\eta_t^1, \eta_t^2, \ldots, \eta_t^M)^T \qquad (5)$$

$$\Omega_k = \begin{pmatrix} \alpha_{1,1,k} & \alpha_{2,1,k} & \cdots & \alpha_{N_k,1,k} \\ \alpha_{1,2,k} & \alpha_{2,2,k} & \cdots & \alpha_{N_k,2,k} \\ \cdots & \cdots & \cdots & \cdots \\ \alpha_{1,M,k} & \alpha_{2,M,k} & \cdots & \alpha_{N_k,M,k} \end{pmatrix} \quad (6)$$

The invention uses a group interference suppression scheme and a combined array processing scheme having space-time coding in order to suppress interference from other groups. Principles of such schemes are disclosed in V. Tarokh, A. Naguib, N. Seshadri, and A. R. Calderbank, "Combined Array Processing and Space-Time Coding," *IEEE Trans. Inform. Theory*, vol. 45, pp. 1121-1128, May 1999. In addition, it is assumed in the invention that $M \geq N - N_k + 1$, and that a receiver knows channel state information matrixes $\Omega_k$ ($1 \leq k \leq K$). For each matrix $\Omega_k$, the following definition can be given: $\Lambda_k = [\Omega_1, \ldots, \Omega_{k-1}, \Omega_{k+1}, \ldots, \Omega_K]$.

As disclosed in the Tarokh reference above, a set $\{v^k_1, v^k_2, \ldots, v^k_{N_k+M-N}\}$ of orthogonal row vectors such as $v^k_j \Lambda_k = (0, 0, \ldots, 0) (j=1, \ldots, N_k+M-N)$ can be made. It is assumed that $\phi_k$ is a $(N_k+M-N) \times M$ matrix in which its $j^{th}$ column is $v^k_j$. If both sides of Equation (2) are multiplied by $\phi_k$, then Equation (7) below is derived.

$$\tilde{r}_t^k = \sqrt{E_k} \tilde{\Omega}_k c_t^k + \tilde{\eta}_t^k \quad (7)$$

In Equation (7), $\tilde{r}_t^k = \Phi_k r_t$, $\tilde{\Omega}_k = \phi_k \Omega_k$, and $\tilde{\eta}_t^k = \phi_k \eta_t$.

Equation (7) indicates that transmission signals from antennas in other groups are suppressed. It has been proved in the reference, V. Tarokh, A. Naguib, N. Seshadri, and A. R. Calderbank, "Space-time Codes for High Data Rate Wireless Communications: Performance Criteria in the Presence of Channel Estimation Errors, Mobility, and Multiple Paths," *IEEE Trans. Inform. Theory*, vol. 47, pp. 199-207, February 1999, that the same performance can be achieved for a transmission scenario by treating the vector $\tilde{r}_t^k$ as a reception vector for a space-time transmission model having $N_k$ transmission antennas and $(M-N+N_k)$ reception antennas, all of which are using space-time codes $C_k$. Therefore, the scheme proposed in the reference can provide diversity of a level of a maximum of $N_k \times (M-N+N_k)$, for the full diversity space-time codes.

B. PRINCIPLES OF THE INVENTION

(B-1) Overlapped Antenna Grouping

Since $(N-N_t)$ dimensions in a receiver are used to suppress transmissions from antennas in other groups, the combined array processing and space-time coding scheme disclosed in the reference of V. Tarokh, A. Naguib, N. Seshadri, and A. R. Calderbank, "Combined Array Processing and Space-Time Coding," *IEEE Trans. Inform. Theory*, vol. 45, pp. 1121-1128, May 1999 cannot optimize trade-off between diversity gain and multiplexing gain. In several cases, a large number of N×M dimensions provided by an excessive number of N transmission antennas and M reception antennas may cause waste.

Problems with such conventional technology are addressed by the present invention. The assumption given in the reference V. Tarokh, A. Naguib, N. Seshadri, and A. R. Calderbank, "Combined Array Processing and Space-Time Coding," *IEEE Trans. Inform. Theory*, vol. 45, pp. 1121-1128, May 1999 for placing antennas in non-overlapping groups formed by dividing N transmission antennas is excessively restrictive. The present invention attempts to improve upon the conventional technology by allowing antennas in different groups to have common elements. If there are K antenna groups each comprised of elements $N_1$, $N_2, \ldots, N_K$, the conventional technology satisfies $N_1 + N_2 + \ldots + N_K = N$, whereas the present invention satisfies $N_1 + N_2 + \ldots + N_K \geq N$. This requires that respective transmission antennas i ($i=1, 2, \ldots, N$) be in at least one group. In addition, the present invention attempts to improve upon the conventional technology by using overlapped space-time coding techniques which can be realized by using simple coding and decoding algorithms. A structure implementing this new kind of space-time codes will be described in detail herein below.

(B-2) Overlapped Space-Time Coding

An overlapped space-time encoder according to the present invention is comprised of the following three kinds of elements.

First, overlapped antennas divided into groups $G_k$ (k=1, 2, ..., K) each comprised of a number of antennas $N_1$, $N_2, \ldots, N_K$.

Second, component space-time codes $C_k$ corresponding to individual groups $G_k$ (k=1,2, ..., K), the component space-time codes being designed for transmission using $N_k$ antennas and having codewords defined on a signal constellation $A_k$.

Third, a one-to-one function $F_i(x_{i,1}, x_{i,2}, \ldots, x_{i,1(i)})$ for respective transmission antennas i ($i=1, 2, \ldots, N$), which are elements of groups $G_{k1}, G_{k2}, \ldots, G_{ki(i)}$. A domain of the one-to-one function is $A_{k1} \times A_{k2} \times \ldots \times A_{k1(i)}$, and its range is a signal constellation $Q_i$.

An overlapped space-time encoder according to the present invention performs the following coding operation.

An input to the overlapped space-time encoder is a block of B input bits at each time slot t. The input bits are divided into K streams having lengths $B_1, B_2, \ldots, B_K$ which satisfy $B_1 + B_2 + \ldots + B_K = B$. Each block $B_k$ ($1 \leq k \leq K$) is encoded by a component space-time coder $C_k$. Output of the component space-time coder $C_k$ is a sequence $c_t^{1,k}, c_t^{2,k}, \ldots c_t^{Nk,k}$ at each time t. Here, $c_t^{i,k} \in A_k$ means an $i^{th}$ output symbol of the component space-time coder $C_k$. If it is assumed that $c_t^{i,k}$ ($i=1, 2, \ldots, N_k$) corresponds to an $i^{th}$ transmission antenna in a group $G_k$, a relation between an output of the $C_k$ and the antennas in a group $G_k$ is defined as follows. At each time t, the coder calculates symbols $q_t^i = F_i(c_t^{i_1,k_1}, c_t^{i_2,k_2}, \ldots, c_t^{i_{l(i)},k_{1:0}})$ for each transmission antenna i, assuming that an antenna i is an $i_p^{th}$ antenna in a group $G_{kp}$ (p=1, 2, ..., 1(i)). The symbols $q_t^1, q_t^2, \ldots, q_t^N$ are output signals that are simultaneously transmitted from antennas 1, 2, ..., N at a time t.

(B-3) Overlapped Space-Time Decoding

A first step for a decoding operation of an overlapped space-time code is suppressing transmissions from all antennas not belonging to a group $G_k$ for every k=1, 2, ..., K. That is, the present invention performs combined array processing, using a group interference suppression scheme and space-time coding, in order to suppress interference from other groups.

It is assumed that a receiver for the decoding operation knows a channel state information matrix $\Omega$ defined as in Equation (8):

$$\Omega = \begin{pmatrix} \alpha_{1,1} & \alpha_{2,1} & \cdots & \alpha_{N,1} \\ \alpha_{1,2} & \alpha_{2,2} & \cdots & \alpha_{N,2} \\ \cdots & \cdots & \cdots & \cdots \\ \cdots & \cdots & \cdots & \cdots \\ \alpha_{1,M} & \alpha_{2,M} & \cdots & \alpha_{N,M} \end{pmatrix} \quad (8)$$

In Equation (8), $\alpha_{i,j}$ is a path gain from a transmission antenna i=1,2, ..., N to a reception antenna j=1, 2, ..., M. As mentioned above, a signal $r_t^j$ received by an antenna j at a time t is represented as in Equation (9):

$$r_t^j = \sum_{i=1}^{N} \alpha_{i,j} q_t^i + \eta_t^j \quad (9)$$

In Equation (9), $\eta_t^j$ is a channel noise between a transmission antenna and a reception antenna j at a time t. If Equation (9) is converted into a vector form, then Equation (10) results:

$$r_t = \Omega_k q_t + \eta_t \quad (10)$$

Variables used in Equation (10) are represented by Equation (11), Equation (12) and Equation (13) below.

$$q_t = (q_t^1, q_t^2, \ldots, q_t^N)^T \quad (11)$$

$$r_t = (r_t^1, r_t^2, \ldots, r_t^M)^T \quad (12)$$

$$\eta_t = (\eta_t^1, \eta_t^2, \ldots, \eta_t^M)^T \quad (13)$$

$\Lambda_k$ is defined as a $\{M \times N - N_k\}$ sub-matrix of $\Omega$ corresponding to all columns which are not elements of a group $G_k$, and $\Omega_k$ and $q_t^k$ are defined as sub-matrixes $\Omega$ and $q_t$ corresponding to all columns in each group $G_k$, respectively. If it is assumed that $M \geq N - N_k + 1$, a set $\{v_1^k, v_2^k, \ldots, v_{N_k+M-N}^k\}$ of orthogonal row vectors can be made as $v_j^k \Lambda_k = (0, 0, \ldots, 0)(j=1, \ldots, N_k+M-N)$. $\Phi_k$ is defined as a $(N_k+M-N) \times M$ matrix in which the $j^{th}$ row is $v_j^k$.

If both sides of Equation (10) are multiplied by $\Phi_k$, then Equation (14) below is derived.

$$\tilde{r}_t^k = \tilde{\Omega}_k q_t^k + \tilde{\eta}_t^k \quad (14)$$

In Equation (14), $\tilde{r}_t^k = \Phi_k r_t$, $\tilde{\Omega}_k = \Phi_k \Omega_k$, and $\tilde{\eta}_t^k = \Phi_k \eta_t$. Equation (14) indicates that transmissions from antennas corresponding to all other groups except a group $G_k$ are suppressed.

Since a decoding operation for $G_1$ is similar to decoding operations of $G_2, \ldots, G_K$, only a second step of the decoding operation for $G_1$ will be described. That is, it can be assumed that k=1, and elements of $G_1$ are antennas 1, 2, ..., $N_1$. For i=1, 2, ..., $N_1$, $q_t^{i,1}$ is defined as an $i^{th}$ element of $q_t^1$. Therefore, if it is assumed that an antenna i=1, 2, ..., $N_1$ is an $i_p^{th}$ element of a group $G_{kp}$, then $q_t^{i,1} = F_t(c_t^{i_1,k}1, c_t^{i_2,k}2, \ldots, c_t^{i_1(i),k_1(i)})$.

A decoder of a component code $C_1$ regards a vector $\tilde{r}_t^1$ as a received word, and regards a matrix $\tilde{\Omega}_1$ as a channel. The decoder of a component code $C_1$ determines a codeword $c^{1,1}c_1^{2,1} \ldots c_1^{N_1,1}c_2^{1,1}c_2^{2,1} \ldots c_2^{N,1} \ldots c_L^{1,1}c_L^{2,1} \ldots c_L^{N_1,1}$. The decoder calculates $C_1$ by minimizing the sum $$\sum_{t=1}^{L} \arg\min_{x_{1,2},\cdots,x_{1,I(1)},\ldots,\,\ldots\,x_{N_1,2},\ldots,x_{N_1(N_1)}}$$
$$\left\| r_t^1 - \Omega_1 \left( F_1(c_1^{1,1}, x_{L,2}, \cdots, x_{L,1(L)}), \cdots, F_{N_1}(c_T^{K_1,1}, x_{N1(N_1)}) \right)^T \right\|^2$$

of all codewords of the component code $C_1$. The minimization codewords can be calculated using a Viterbi algorithm.

When a decoding operation is performed using a trellis code, it should be noted that different selections in $x_{1,2}, \ldots, x_{1,I(1)}, \ldots, \ldots x_{N_i,2}, \ldots, x_{N_1,I(N_i)}$ bring about parallel transitions in a trellis diagram of $C_1$. If $F_i$(i=1,2, ..., N) is selected with attention, fast calculation for minimizing codewords can be achieved.

C. EMBODIMENTS

Figure 1:
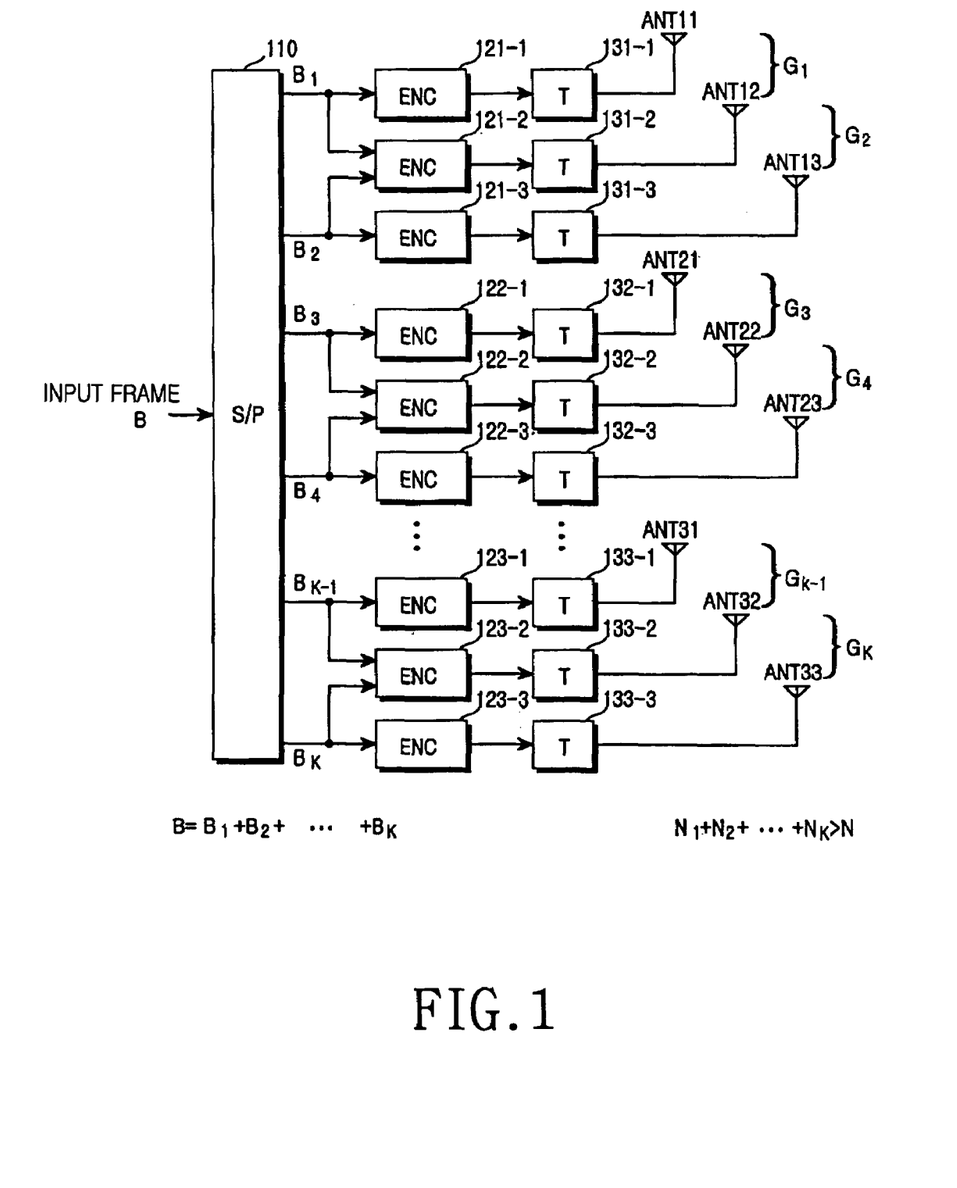
FIG. 1 is a block diagram illustrating a transmission apparatus in a mobile communication system according to a preferred embodiment of the present invention.

FIG. 1 is a block diagram illustrating a transmission apparatus in a mobile communication system according to a preferred embodiment of the present invention.

Referring to FIG. 1, a transmission apparatus includes a serial-to-parallel (S/P) converter 110, encoders 121-1 to 121-3, 122-1 to 122-3, ..., 123-1 to 123-3, transmitters 131-1 to 131-3, 132-1 to 132-3, ..., 133-1 to 133-3, and antennas ANT11 to ANT13, ANT21 to ANT23, ..., ANT31 to ANT33. The S/P converter 110 serves as a frame segmentation section for segmenting an input frame into k bit groups. For example, when the input frame is $B = B_1 + B_2 + \ldots + B_k$, the S/P converter 110 outputs bit groups $B_1, B_2, \ldots, B_k$ each comprised of a predetermined number of bits (or symbols).

The encoders are divided into a first group of encoders and a second group of encoders. The encoders in the first group encode k input bit groups, and output encoded symbols. The encoders 121-1, 121-3, 122-1, 122-3, ..., 123-1, 123-3 correspond to the encoders in the first group. The encoders in the second group encode at least two bit groups among the k input bit groups, and output encoded symbols. The encoders 121-2, 122-2, ..., 123-2 correspond to the encoders in the second group. Although an example has been shown and described in which each of the encoders in the second group encodes two bit groups, the invention can also be applied when each of the encoders in the second group encodes more than two bit groups. This is because the invention is characterized by overlapping two or more bit groups and then transmitting the overlapped bit groups via one antenna. Such encoders perform a coding operation by a trellis code as described below.

The transmitters 131-1 to 131-3, 132-1 to 132-3, ..., 133-1 to 133-3 are connected to the encoders 121-1 to 121-3, 122-1 to 122-3, ..., 123-1 to 123-3, respectively, and convert the encoded symbols from the encoders into signals appropriate to be transmitted via antennas. For example, the transmitters performs modulation, spreading, IF (Intermediate Frequency) conversion and RF (Radio Frequency) conversion on the encoded symbols.

The antennas ANT11 to ANT13, ANT21 to ANT23, ..., ANT31 to ANT33 are connected to the transmitters 121-1 to 121-3, 122-1 to 122-3, ..., 123-1 to 123-3, respectively. The antennas are divided into a predetermined number of groups of antennas. Herein, each antenna group has two antennas. That is, in the drawing, antennas ANT11 and ANT12 constitute a first group $G_1$, antennas ANT12 and ANT13 constitute a second group $G_2$, antennas ANT21 and ANT22 constitute a third group $G_3$, antennas ANT22 and ANT23 constitute a fourth group $G_4$, antennas ANT31 and ANT32 constitute a $(K-1)^{th}$ group $G_{K-1}$, and antennas ANT32 and ANT33 constitute a $K^{th}$ group $G_K$. If it is assumed that the numbers of antennas in the groups are $N_1, N_2, \ldots, N_K$, respectively, it is preferable that the total sum $N_k$ of the numbers of antennas in the respective groups is larger than the number N of antennas.

The transmitters 131-1 to 131-3, 132-1 to 132-3, ..., 133-1 to 133-3 and the antennas ANT11 to ANT13, ANT21 to ANT23, ..., ANT31 to ANT33 constitute a transmission section. The number of antennas in each group can be set to the same number or different numbers without departing from the sprit and scope of the invention. Here, the "spirit of the invention" means that at least one antenna operates not only as an antenna in a particular group but also as an antenna in another group. That is, it means that at least one antenna overlaps signals to be transmitted via antennas in different groups.

Figure 2:
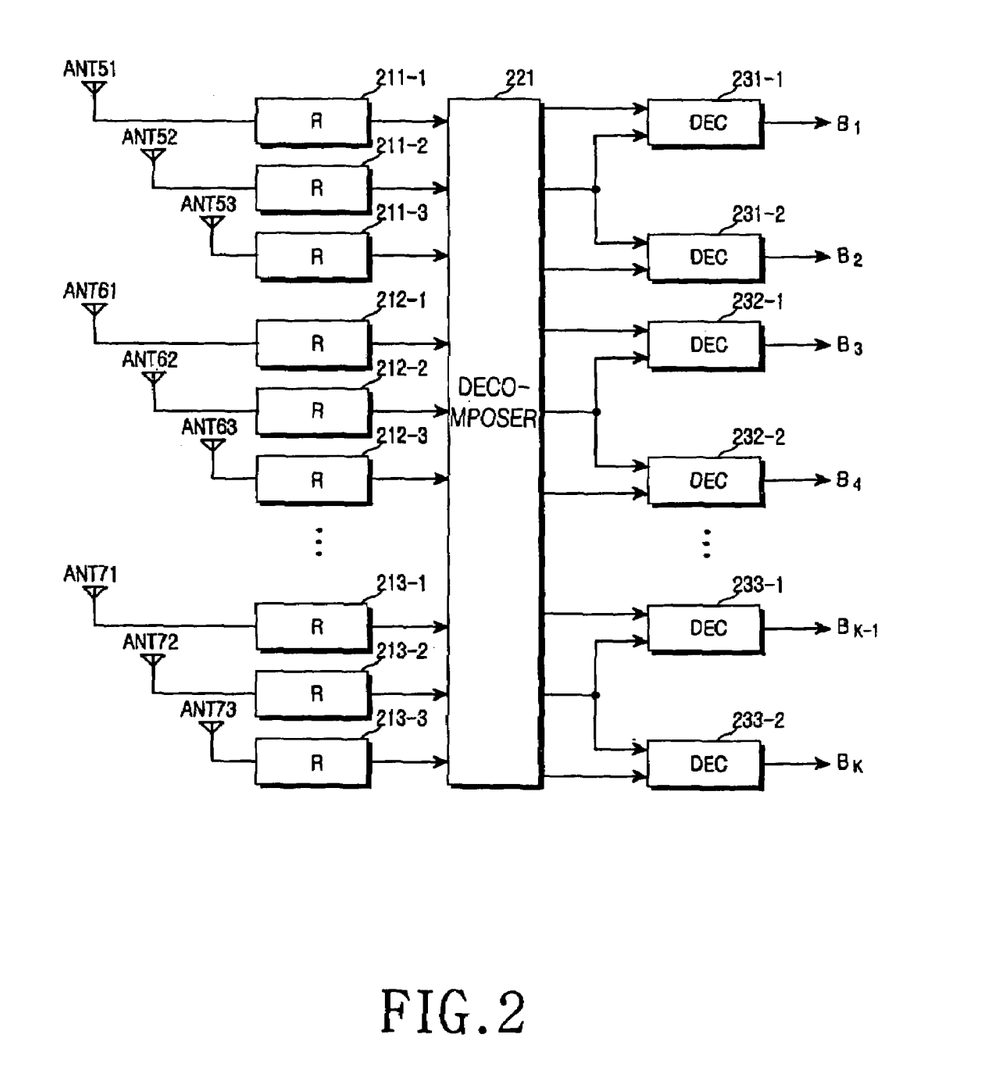
FIG. 2 is a block diagram illustrating a reception apparatus in a mobile communication system according to a preferred embodiment of the present invention.

FIG. 2 is a block diagram illustrating a reception apparatus in a mobile communication system according to a preferred embodiment of the present invention. This block diagram corresponds to the block diagram of the transmission apparatus shown in FIG. 1.

Referring to FIG. 2, a reception apparatus includes M antennas ANT51 to ANT53, ANT61 to ANT63, ..., ANT71 to ANT73, M receivers 211-1 to 211-3, 212-1 to 212-3, ..., 213-1 to 213-3, a decomposer 221, and decoders 231-1 to 231-2, 232-1 to 232-2, ..., 233-1 to 233-2.

The M antennas ANT51 to ANT53, ANT61 to ANT63, ..., ANT71 to ANT73 are connected to the M receivers 211-1 to 211-3, 212-1 to 212-3, ..., 213-1 to 213-3, respectively, and receive signals on a radio channel. The receivers 211-1 to 211-3, 212-1 to 212-3, ..., 213-1 to 213-3 process signals received via the antennas ANT51 to ANT53, ANT61 to ANT63, ..., ANT71 to ANT73. For example, the receivers 211-1 to 211-3, 212-1 to 212-3, ..., 213-1 to 213-3 perform IF conversion, baseband conversion, despreading and demodulation on the signals received via the corresponding antennas. The antennas ANT51 to ANT53, ANT61 to ANT63, ..., ANT71 to ANT73, and the receivers 211-1 to 211-3, 212-1 to 212-3, ..., 213-1 to 213-3 constitute a reception section.

The decomposer 221 decomposes at least one reception symbol among M reception symbols output from the receivers so as to output the decomposed symbol to at least two decoders among the decoders. For example, the decomposer 221 detects signals transmitted from the transmitters 131-1 to 131-3 by decomposing reception symbols output from the receivers 211-1 to 213-3,l and outputs the detected signals to decoders 231-1 and 231-2. In this way, the decomposer 221 separates signals transmitted from the transmitters 132-1 to 132-3 and 133-1 to 133-3 from a received signal, and outputs the separated signals to the decoders 232-1 to 232-2, ..., 233-1 to 233-2.

The decoders 231-1 to 231-2, 232-1 to 232-2, ..., 233-1 to 233-2 receive corresponding reception symbols from the decomposer 221, and perform a decoding operation on the received symbols as described below. The decoder 231-1 decodes reception symbols provided from the receiver 211-1 and 211-2 via the decomposer 221. The decoder 231-2 decodes reception symbols provided from the receiver 211-2 and 211-3 via the decomposer 221. The decoder 232-1 decodes reception symbols provided from the receiver 212-1 and 212-2 via the decomposer 221. The decoder 232-2 decodes reception symbols provided from the receiver 212-2 and 212-3 via the decomposer 221. The decoder 233-1 decodes reception symbols provided from the receiver 213-1 and 213-2 via the decomposer 221. The decoder 233-2 decodes reception symbols provided from the receiver 213-2 and 213-3 via the decomposer 221. Such decoders can be realized with a trellis decoder.

The reception antennas can be divided into a predetermined number of groups of antennas, like the transmission antennas illustrated in FIG. 1. Each of the transmission antennas, as described above, transmits a transmission signal in one group, overlapped with a transmission signal in another group. Therefore, the reception antennas receive overlapped signals, and accordingly, the decoders perform a decoding operation on overlapped signals from different groups.

Overlapped space-time coding and decoding operations according to embodiments of the present invention will be described herein below. In the following embodiments, an overlapped space-time coding/decoding operation as disclosed in the reference, V. Tarokh, A. Naguib, N. Seshadri, and A. R. Calderbank, "Combined Array Processing and Space-Time Coding," *IEEE Trans. Inform. Theory*, vol. 45, pp. 1121-1128, May 1999 and its inherent problems, will first be described. Next, an overlapped space-time coding/decoding operation according to an embodiment of the present invention will be described.

(C-1) Embodiment 1

Consider a case where a signal is transmitted using 3 transmission antennas and a signal is received using 3 reception antennas. If it is assumed that the diversity is 2×3=6, only one symbol can be transmitted in a particular transmission time. Such a fact can be well understood from the paper, V. Tarokh, N. Seshadri, and A. R. Calderbank, "Space-Time Codes for High Data Rate Wireless Communications: Performance Criterion and Code Construction," *IEEE Trans. Inform. Theory*, vol. 44, pp. 744-765, March 1998. However, a diversity of 6 may be exceeded, or a transmission rate of 2 symbols per particular transmission time can be provided with a low diversity.

According to the scheme disclosed in the reference of the conventional technology, transmission antennas are assumed to be divided into 2 or 3 non-overlapped groups. When the transmission antennas are divided into 3 non-overlapped groups, the conventional scheme provides diversity of only 1. For example, when the transmission antennas are divided into 2 non-overlapped groups, it can be assumed that a first group has 2 transmission antennas and a second group has one transmission antenna. When decoding a transmission signal of the first group, a receiver provides diversity of a level 4 by suppressing transmission signals of the second group. Similarly, when decoding a transmission signal of the second group, the receiver can obtain a diversity of only 1 by removing transmission signals of the first group. If decoding for transmission signals of the first group is performed successfully and a contribution of this group to a received vector is removed, a diversity of 3 can be provided during decoding for transmission signals of the second group. However, this scheme disadvantageously brings about error propagation if decoding for transmission signals of the first group fails.

Figure 3:
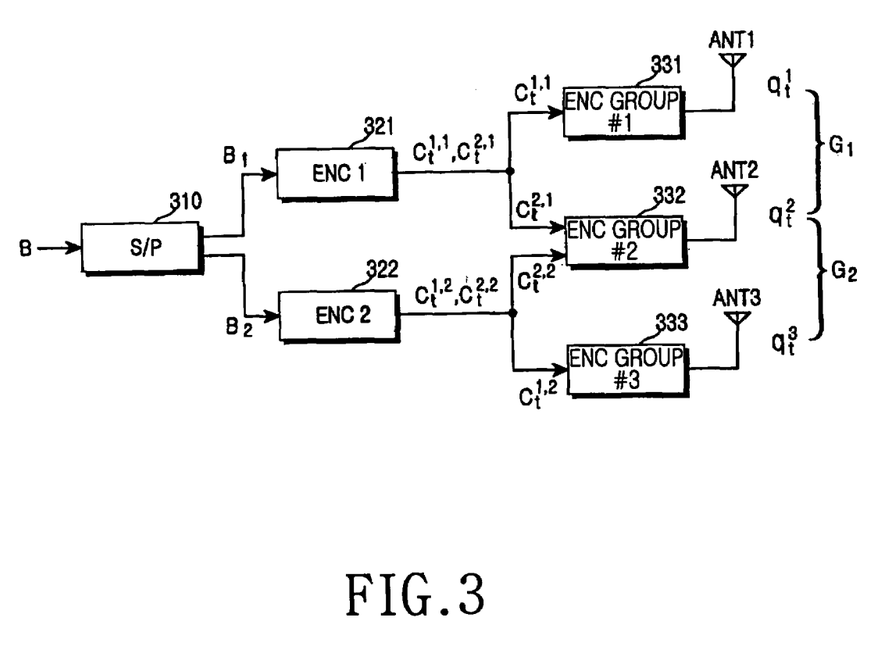
FIG. 3 illustrates a structure of the transmitter of FIG. 1 according to a first embodiment of the present invention.

With reference to FIG. 3, a description will now be made of overlapped space-time coding and a corresponding transmission operation according to an embodiment of the present invention to provide a diversity of 4 and resolve an error propagation problem. In FIG. 3, antennas in a first group $G_1$ include transmission antennas ANT1 and ANT2, and antennas in a second group $G_2$ include transmission antennas ANT2 and ANT3. It is assumed that the transmission antennas ANT1, ANT2 and ANT3 have the same order.

Figure 4:
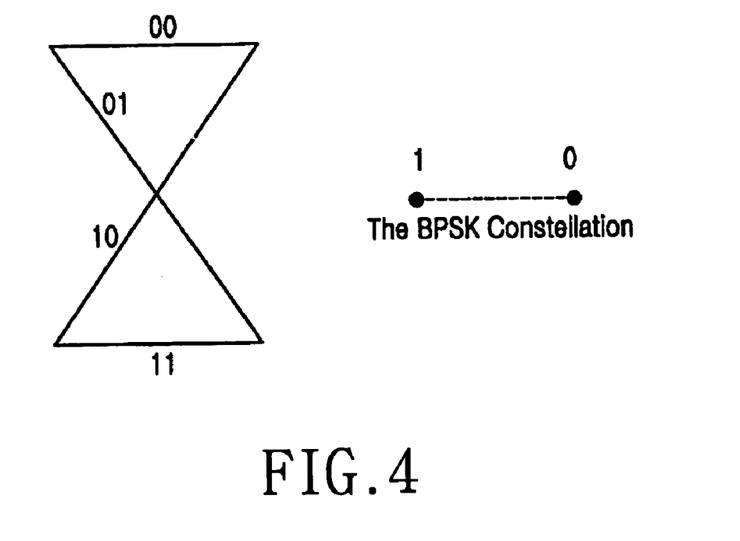
FIG. 4 illustrates a BPSK component code for the first embodiment shown in FIG. 3 wherein the number of transmission antennas is 3 and the number of reception antennas is 3.

It is assumed that codes $C_1$ and $C_2$ are BPSK (Binary Phase Shift Keying) codes illustrated in FIG. 4. For such codes, a definition can be given as in Equation (15):

$$F_1(x_{1,1}) = x_{1,1}, \quad (15)$$

$$F_2(x_{2,1}, x_{2,2}) = \frac{\sqrt{2}}{2}(x_{2,1} + \sqrt{-1}\, x_{2,2}),$$

$$F_3(x_{3,1}) = x_{3,1}.$$

If output symbols of the $C_1$ and $C_2$ at a time t are $c_t^{1,1} c_t^{2,1}$ and $c_t^{1,2} c_t^{1,2} c_t^{2,2}$, respectively, symbols $q_t^1$, $q_t^2$ and $q_t^3$ transmitted from the antennas ATN1, ANT2 and ANT3 are defined as in Equation (16):

$$q_t^1, c_t^{1,1} \quad (16)$$

$$q_t^2 = \frac{\sqrt{2}}{2}(c_t^{2,1} + \sqrt{-1}\, c_t^{2,2}),$$

$$q_t^3 = c_t^{1,2}.$$

In Equation (16), a symbol $q_t^2$ transmitted via the antenna ANT2 that transmits overlapped output symbols is an element of a QPSK (Quadrature Phase Shift Keying) constellation. Unlike $q_t^2$, symbols $q_t^1$ and $q_t^3$ transmitted via the antennas ANT1 and ANT3 are elements of a BPSK constellation.

In order to decode $C_1$, a receiver suppresses a transmission signal from the transmission antenna ANT3. In this case, interference caused by an unknown value $x_{2,2} = c_t^{2,2}$ can be removed using a parallel transition diagram in a trellis diagram, illustrated in FIG. 5, used for decoding of the $C_1$.

Figure 5:
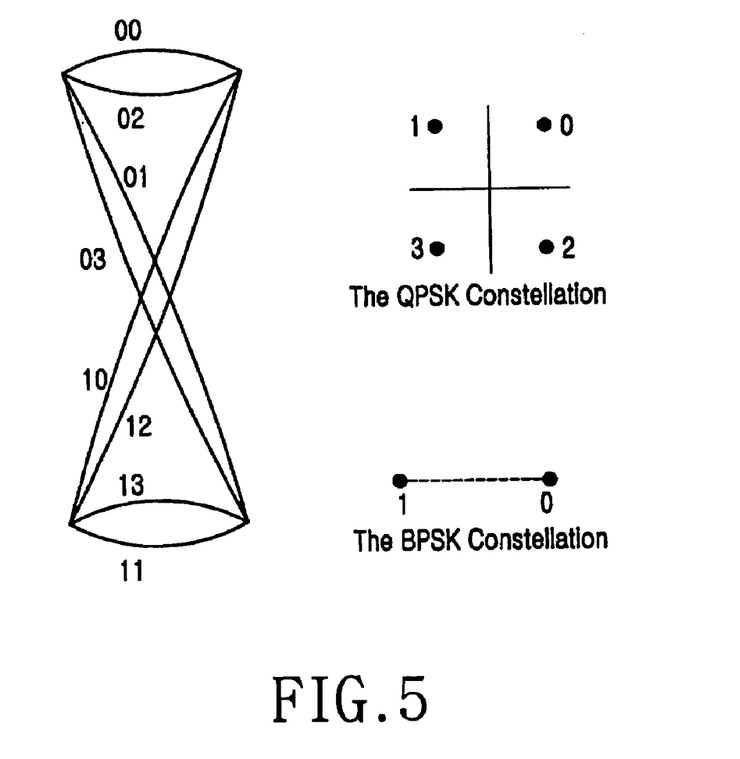
FIG. 5 illustrates a trellis diagram for decoding for the first embodiment shown in FIG. 3 wherein the number of transmission antennas is 3 and the number of reception antennas is 3.

Referring to FIG. 5, first and second symbols of each branch are elements of BPSK and QPSK constellations, respectively. A decoder of a receiver can determine bits of a transmitted codeword and $C_1$ by regarding $\tilde{r}_t^1$ as a received word, regarding $\tilde{\Omega}_1$ as a channel matrix, and applying Viterbi decoding to the trellis diagram illustrated in FIG. 5. Such an operation is possible using the scheme disclosed in the paper, V. Tarokh, N. Seshadri, and A. R. Calderbank, "Space-Time Codes for High Data Rate Wireless Communications: Performance Criterion and Code Construction," *IEEE Trans. Inform. Theory*, vol. 44, pp. 744-765, March 1998. A decoding operation for $C_2$ is performed similarly.

It can be easily proved that the coding and decoding operation according to an embodiment of the present invention provides a diversity of 4.

(C-2) Embodiment 2

Consideration will be taken into a case where a signal is transmitted using 4 transmission antennas and a signal is received using 2 reception antennas. If it is assumed that the diversity is 4×2=8, only one symbol can be transmitted for a particular transmission time. Such a fact can be well understood from the paper, V. Tarokh, N. Seshadri, and A. R. Calderbank, "Space-Time Codes for High Data Rate Wireless Communications: Performance Criterion and Code Construction," *IEEE Trans. Inform. Theory*, vol. 44, pp. 744-765, March 1998. However, a diversity of 8 may be exceeded, or a transmission rate of 2 symbols per particular transmission time can be provided with a low diversity.

If it is assumed that all transmission antennas in two or more non-overlapped groups are used for transmission according to the scheme disclosed in the Tarokh reference of V. Tarokh, A. Naguib, N. Seshadri, and A. R. Calderbank, "Combined Array Processing and Space-Time Coding," *IEEE Trans. Inform. Theory*, vol. 45, pp. 1121-1128, May 1999, there are not provided sufficient reception antennas to decode the transmitted signals using the scheme disclosed in the Tarokh reference of V. Tarokh, A. Naguib, N. Seshadri, and A. R. Calderbank, "Combined Array Processing and Space-Time Coding," *IEEE Trans. Inform. Theory*, vol. 45, pp. 1121-1128, May 1999. When the transmission antennas are divided into 2 non-overlapped groups for signal transmission, the number of reception antennas is insufficient to decode the transmitted signals using the scheme disclosed in the reference of the conventional technology. For example, it can be assumed that a first group has 3 transmission antennas and a second group has one transmission antenna. When decoding a transmission signal of the first group, a receiver provides a diversity of 3 by removing transmission signals of the second group. If decoding for transmission signals of the first group is performed successfully and a contribution of the first group to a received vector is removed, a diversity of 2 can be provided during decoding for transmission signals of the second group. However, this scheme disadvantageously brings about error propagation if decoding of transmission signals of the first group fails.

Figure 6:
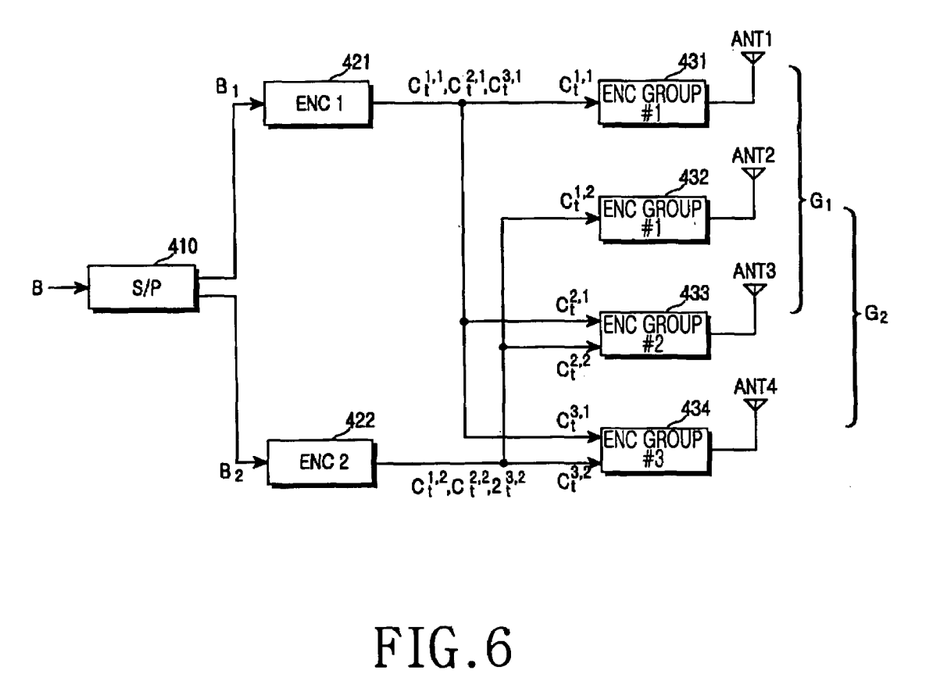
FIG. 6 illustrates a structure of the transmitter of FIG. 1 according to a second embodiment of the present invention.

With reference to FIG. 6, a description will now be made of overlapped space-time coding and a corresponding transmission operation according to an embodiment of the present invention to provide a diversity of 3 with a multiplexing gain of 2 and to resolve an error propagation problem. In FIG. 6, antennas in a first group $G_1$ include transmission antennas ANT1, ANT2 and ANT3, and antennas in a second group $G_2$ include transmission antennas ANT2, ANT3 and ANT4. It is assumed that the transmission antennas ANT1 to ANT4 have the same order.

Figure 7:
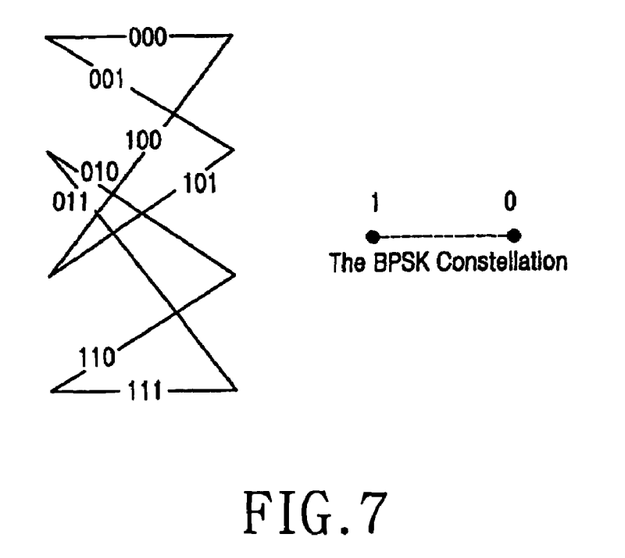
FIG. 7 illustrates a BPSK component code for the second embodiment shown in FIG. 6 wherein the number of transmission antennas is 4 and the number of reception antennas is 2.

It is assumed that codes $C_1$, $C_2$ and $C_3$ are BPSK codes illustrated in FIG. 7. For such codes, a definition can be given as in Equation (17):

$$F_1(x_{1,1}) = x_{1,1}, \quad (17)$$

$$F_1(x_{2,1}) = x_{2,1},$$

$$F_3(x_{1,1}, x_{3,2}) = \frac{\sqrt{2}}{2}(x_{3,1} + \sqrt{-1}\, i x_{3,2}),$$

$$F_4(x_{4,1}, x_{4,2}) = \frac{\sqrt{2}}{2}(x_{4,1} + \sqrt{-1}\, x_{4,2}).$$

If output symbols of the $C_1$, $C_2$ and $C_3$ at a time t are $c_t^{1,1} c_t^{2,1} c_t^{3,1}$ and $c_t^{1,2} c_t^{2,2} c_t^{3,2}$, respectively, symbols $q_t^1$, $q_t^2$, $q_t^3$ and $q_t^4$ transmitted from the antennas ATN1, ANT2, ANT3 and ANT4 are defined as in Equation (18):

$$q_t^1 = c_t^{1,1}, \quad (18)$$

$$q_t^2 = c_t^{2,2},$$

$$q_t^3 = \frac{\sqrt{2}}{2}(c_t^{2,1} + \sqrt{-1}\, c_t^{2,2}),$$

$$q_t^4 = \frac{\sqrt{2}}{2}(c_t^{3,1} + \sqrt{-1}\, c_t^{3,2}).$$

In Equation (18), a symbol $q_t^2$ transmitted via the antenna ANT4 that transmits overlapped output symbols is an element of a 4-PSK (4-ary Phase Shift Keying) constellation. A symbol $q_t^3$ transmitted via the antenna ANT3 is also an element of a 4-PSK constellation. Unlike $q_t^2$ and $q_t^3$, symbols $q_t^1$ and $q_t^4$ transmitted via the antennas ANT1 and ANT4 are elements of a BPSK constellation.

In order to decode $C_1$, a receiver suppresses a transmission signal from the transmission antenna ANT2. In this case, interference caused by unknown values $c_t^{2,2}$ and $c_t^{3,2}$ can be removed using a parallel transition diagram in a trellis diagram, illustrated in FIG. 8, used for decoding $C_1$.

Figure 8:
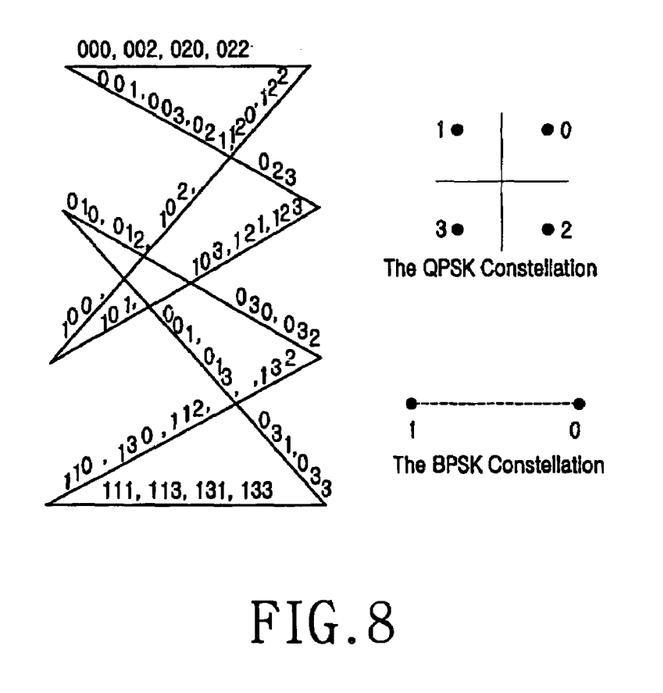
FIG. 8 illustrates a trellis diagram for decoding for the second embodiment shown in FIG. 6 wherein the number of transmission antennas is 4 and the number of reception antennas is 2.

Referring to FIG. 8, all possible parallel transitions between two particular states are written on a segment of a connection line. First symbols of each branch are elements of a BPSK constellation, and second and third symbols of each branch are elements of a QPSK constellation. A decoder of a receiver can determine bits of a transmitted codeword and $C_1$ by regarding $\tilde{r}_t^1$ as a received word, regarding $\tilde{\Omega}_1$ as a channel matrix, and applying Viterbi decoding to the trellis diagram illustrated in FIG. 8. Such an operation is possible using the scheme disclosed in the paper, V. Tarokh, N. Seshadri, and A. R. Calderbank, "Space-Time Codes for High Data Rate Wireless Communications: Performance Criterion and Code Construction," *IEEE Trans. Inform. Theory*, vol. 44, pp. 744-765, March 1998. A decoding operation for $C_2$ is performed similarly.

It can be easily proved that the coding and decoding operation according to an embodiment of the present invention provides a diversity of 4.

As can be appreciated from the two embodiments described above, diversity gain of $(N-\gamma+1)(M-\gamma+1)$ can be achieved assuming that a multiplexing gain $\gamma$ is given and signals are transmitted using N transmission antennas and M reception antennas. In addition, during decoding of overlapped space-time codes, it is possible to obtain diversity of higher levels in order to remove a contribution of a group to a received word and perform decoding on the other groups as soon as decoding is performed in each group. For example, if interferences of a first group to a word received after decoding of $C_1$ are removed in the second embodiment, a second group will be decoded with a diversity of 6.

By removing interferences of all other groups to a received word as soon as decoding of all groups is performed, decoding of different steps of each group is performed. It would be obvious to those skilled in the art that decoding performance is improved by such a repetitive operation.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A signal transmission apparatus in a mobile communication system, comprising:
   a frame segmentation section for segmenting an input frame into k bit groups;
   a first group of encoders for encoding the k bit groups and outputting encoded symbols;
   a second group of encoders for encoding at least two bit groups among the k bit groups and outputting encoded symbols; and
   a transmission section including a plurality of antennas in groups of a predetermined number of antennas, the number N of the antennas being larger than k, the transmission section transmitting the symbols encoded by each of the encoders in the second group via at least one antenna of the grouped antennas.

2. The signal transmission apparatus of claim 1, wherein the encoders are trellis encoders.

3. The signal transmission apparatus of claim 1, wherein the total sum $N_k$ of numbers of antennas in the groups of antennas is larger than N.

4. A signal transmission method in a mobile communication system, comprising the steps of:
   segmenting an input frame into k bit groups;
   encoding, by a first group of encoders, the k bit groups and outputting encoded symbols;
   encoding, by a second group of encoders, at least two bit groups among the k bit groups and outputting encoded symbols; and
   grouping N antennas in groups of a predetermined number of antennas, N being larger than k, and transmitting symbols encoded by at least one encoder of the second group of encoders via at least one antenna of the grouped antennas.

5. The signal transmission method of claim 4, wherein the encoded symbols are symbols encoded by a trellis encoder.

6. The signal transmission method of claim 4, wherein the total sum $N_k$ of numbers of antennas of the groups of antennas is larger than N.

7. A signal reception apparatus in a mobile communication system, comprising:
   M antennas each connected to a different one of M receivers in groups of a predetermined number of receivers, each receiver outputting a reception symbol;
   a decomposer for decomposing the M reception symbols output from the M receivers into two groups of decomposed symbols, and outputting each decomposed symbol of the first group of decomposed symbols to a different decoder from a group of k decoders, and outputting each decomposed symbol of the second group of decomposed symbols to at least two different k decoders; and
   k decoders, k being a less than the number of antennas M, each decoder receiving a decomposed symbol from the first group of decomposed symbols and a decomposed symbol from the second group of decomposed symbols, each decoder outputting a bit group.

8. The signal reception apparatus of claim 7, wherein the decoders are trellis decoders.

9. The signal reception apparatus of claim 7, wherein the antennas are in groups of a predetermined number of antennas.

10. A signal reception method in a mobile communication system, comprising the steps of:
    receiving signals via M antennas connected to a different one of M receivers in groups of a predetermined number of receivers, each receiver outputting a reception symbol;
    decomposing at least one reception symbol of M reception symbol output from different groups of receivers; and
    outputting the decomposed reception symbol of a first group of decomposed symbols to a different decoder from a group of k decoders, and outputting each decomposed symbol of a second group of decomposed symbols to at least two different ones of the decoders, each decoder outputting a bit group k being less than M.

11. The signal reception method of claim 10, wherein the decoders are trellis decoders.

12. The signal reception method of claim 10, wherein the antennas are in groups of a predetermined number of antennas.

* * * * *